United States Patent
Calvin

(10) Patent No.: US 8,762,938 B2
(45) Date of Patent: Jun. 24, 2014

(54) OBJECT-ORIENTED SYSTEM FOR CREATING AND MANAGING WEBSITES AND THEIR CONTENT

(75) Inventor: Phil Calvin, Vancouver (CA)

(73) Assignee: salesforce.com, inc., San Francisco, CA (US)

( * ) Notice: Subject to any disclaimer, the term of this patent is extended or adjusted under 35 U.S.C. 154(b) by 649 days.

(21) Appl. No.: 12/935,890

(22) PCT Filed: Apr. 28, 2009

(86) PCT No.: PCT/CA2009/000569
§ 371 (c)(1),
(2), (4) Date: Sep. 30, 2010

(87) PCT Pub. No.: WO2009/132444
PCT Pub. Date: Nov. 5, 2009

(65) Prior Publication Data
US 2011/0029879 A1  Feb. 3, 2011

Related U.S. Application Data

(60) Provisional application No. 61/048,516, filed on Apr. 28, 2008.

(51) Int. Cl.
*G06F 9/44* (2006.01)
*G06F 15/16* (2006.01)
*H04L 29/06* (2006.01)

(52) U.S. Cl.
CPC .............. *G06F 8/34* (2013.01); *H04L 29/06312* (2013.01); *H04L 65/1063* (2013.01)
USPC ............ 717/108; 717/106; 717/120; 709/203

(58) Field of Classification Search
CPC ............... G06F 8/30; G06F 8/33; G06F 8/34; H04L 29/06312; H04L 65/1063
USPC ........... 717/106–109, 120–123; 709/201–203
See application file for complete search history.

(56) References Cited

U.S. PATENT DOCUMENTS 5,577,188 A  11/1996  Zhu
5,608,872 A   3/1997  Schwartz et al.
(Continued)

FOREIGN PATENT DOCUMENTS

WO  WO-2005062211  7/2005
WO  WO-2007092373  8/2007

OTHER PUBLICATIONS

Chen et al., "Function-Based Object Model Towards Website Adaptation," May 2001, ACM, p. 587-596.*

(Continued)

*Primary Examiner* — Qing Chen
(74) *Attorney, Agent, or Firm* — Blakely, Sokoloff, Taylor & Zafman

(57) ABSTRACT

The invention teaches a method for creating and managing a website as an object oriented system, comprising: providing on a system server a plurality of hierarchical classes of objects, each of the classes representing one aspect of the storage, presentation and logic of a website; providing on a web server an interface operable to present representations of objects instantiating the plurality of hierarchical classes and receive commands meant to one of: instantiate a new object, destroy a presented object, and change a property of a presented object; and storing on a database server objects as a traversable tree in accordance with the plurality of hierarchical classes.

19 Claims, 10 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,505,212 B2 * | 1/2003 | Nakano et al. ............... 707/691 |
| 6,535,909 B1 | 3/2003 | Rust |
| 6,546,397 B1 * | 4/2003 | Rempell ........................ 1/1 |
| 6,549,908 B1 | 4/2003 | Loomans |
| 6,553,563 B2 | 4/2003 | Ambrose et al. |
| 6,560,461 B1 | 5/2003 | Fomukong et al. |
| 6,560,639 B1 * | 5/2003 | Dan et al. ..................... 709/218 |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,732,332 B1 * | 5/2004 | Borysewicz et al. ......... 715/240 |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,792,454 B2 * | 9/2004 | Nakano et al. ............... 709/219 |
| 6,792,475 B1 * | 9/2004 | Arcuri et al. .................. 709/245 |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,938,050 B2 | 8/2005 | Le et al. |
| 6,957,218 B1 * | 10/2005 | Wyatt ............................. 1/1 |
| 7,003,528 B2 * | 2/2006 | Dan et al. ..................... 709/217 |
| 7,032,225 B2 | 4/2006 | Wang et al. |
| 7,171,664 B2 | 1/2007 | Wang et al. |
| 7,287,215 B2 * | 10/2007 | Arcuri et al. .................. 715/206 |
| 7,340,411 B2 | 3/2008 | Cook |
| 7,620,655 B2 | 11/2009 | Larsson et al. |
| 7,627,649 B2 * | 12/2009 | Saras ............................ 709/218 |
| 8,397,223 B2 * | 3/2013 | Chiang ......................... 717/145 |
| 8,402,427 B2 * | 3/2013 | Chiang ......................... 717/106 |
| 2001/0037490 A1 * | 11/2001 | Chiang .............................. 717/2 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0046245 A1 * | 4/2002 | Hillar et al. .................. 709/205 |
| 2002/0049697 A1 * | 4/2002 | Nakano et al. ................... 707/1 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0014442 A1 | 1/2003 | Shiigi et al. |
| 2003/0018705 A1 | 1/2003 | Chen et al. |
| 2003/0018830 A1 | 1/2003 | Chen et al. |
| 2003/0028517 A1 * | 2/2003 | Nakano et al. ................... 707/1 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0204810 A1 * | 10/2003 | Dam et al. .................... 715/500 |
| 2003/0206192 A1 | 11/2003 | Chen et al. |
| 2003/0217117 A1 * | 11/2003 | Dan et al. ..................... 709/218 |
| 2003/0225730 A1 | 12/2003 | Warner et al. |
| 2003/0226132 A1 * | 12/2003 | Tondreau et al. ............. 717/116 |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0123238 A1 * | 6/2004 | Hefetz et al. ................. 715/513 |
| 2004/0128001 A1 | 7/2004 | Levin et al. |
| 2004/0167989 A1 * | 8/2004 | Kline et al. ................... 709/245 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0230983 A1 | 11/2004 | Shi et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0005089 A1 | 1/2005 | Eckhart et al. |
| 2005/0028081 A1 * | 2/2005 | Arcuri et al. ................. 715/501.1 |
| 2005/0050555 A1 | 3/2005 | Exley et al. |
| 2005/0060687 A1 * | 3/2005 | Ghazaleh et al. ............. 717/123 |
| 2005/0091098 A1 | 4/2005 | Brodersen et al. |
| 2005/0235256 A1 | 10/2005 | Freydl |
| 2005/0246627 A1 * | 11/2005 | Sayed ........................... 715/513 |
| 2006/0294500 A1 * | 12/2006 | Chiang ......................... 717/109 |
| 2007/0061408 A1 * | 3/2007 | Saras ............................ 709/217 |
| 2007/0204013 A1 * | 8/2007 | Castrucci ...................... 709/219 |

(56) References Cited

U.S. PATENT DOCUMENTS

2008/0052668 A1* 2/2008 Craig et al. .................. 717/111
2008/0172608 A1* 7/2008 Patrawala et al. ............ 715/255

OTHER PUBLICATIONS

Atterer et al., "Tracking the Interaction of Users with AJAX Applications for Usability Testing," Apr./May 2007, ACM, p. 1347-1350.*
International Search Report from International Application No. PCT/CA2009/00569 mailed Jul. 27, 2009 (3 pages).
Written Opinion from International Application No. PCT/CA2009/00569 mailed Jul. 27, 2009 (6 pages).
Office Action for Canadian Patent Application No. 2,720,897 mailed Jan. 18, 2013, 3 pgs.
Office Action for U.S. Appl. No. 12/895,715 mailed Oct. 12, 2012, 18 pgs.
Notice of Allowance for U.S. Appl. No. 12/895,713 mailed Jun. 25, 2013, 18 pages.
Office Action for Canadian Patent Application No. 2720897 mailed Dec. 16, 2013, 3 pages.
Examination Report for European Patent Application No. 09737586.9 mailed Nov. 14, 2013, 6 pages.
Atterer, et al., "Tracking the Interaction of Users with AJAX Applications for Usability Testing," Apr./May 2007, ACM, p. 1347-1350.
Chen, et al., "Function-Based Object Model Towards Website Adaptation," May 2001, ACM, p. 587-596.

* cited by examiner

OBJECT-ORIENTED SYSTEM FOR CREATING AND MANAGING WEBSITES AND THEIR CONTENT

CROSS REFERENCE TO RELATED APPLICATION

This application is a Section 371 National Stage Application of International Application No. PCT/CA2009/000569, filed Apr. 28, 2009, which claims the benefit of U.S. Provisional Application No. 61/048,516, filed Apr. 28, 2008, the entire contents of which are incorporated herein by reference.

BACKGROUND OF THE INVENTION

1. Field of the Invention

The present invention is directed to ways to create and manage websites and their content. More particularly, the invention is directed to an object-oriented way to create and manage dynamic websites and their content.

2. Description of the Related Art

Today, web pages and their content are typically created, managed and delivered using a variety of tools and systems. Programming tools (e.g. Adobe Dreamweaver™) are commonly used for web page creation, and authoring tools (e.g. Microsoft Word™ or Adobe PhotoShop™) are commonly used for content creation. Content Management Systems (e.g. Drupal™ or OpenCMS™) may also be used for controlling and transforming content after it has been created, and version control systems and database and web servers are used for storing and delivering the web pages and their content to end user browsers.

While in some cases it may be valuable from a "separation of concerns" perspective (i.e. having the creative department use one set of tools, and the IT department use others), the use of tools and systems that are not integrated makes it necessary to integrate the work product of each department in a separate, final step to permit a given web page and its content to be published to the Internet. One problem with this approach is that it is time consuming, and this problem is exacerbated by the tendency that websites (and their content) are rarely static. Almost all websites change frequently, being updated constantly to reflect changes in the organization or individual publishing the website or in its (or his/her) environment.

The absence of an integrated system makes creating and revising content and a set of web pages on a website (or on any given web page of a website) unduly difficult in terms of both effort and complexity. Once design mock-ups and digital assets (e.g. art, photos, and videos) have been developed, the website's web pages are built with these design elements using HTML, CSS and JavaScript programming languages to achieve the effects called-for in the design. Next (or in parallel), news articles, product data sheets and other information are developed to form the content for the site.

At this point the user faces a choice of whether or not to use a Content Management System (a "CMS"). Content Management Systems are typically employed if the content on a website is expected to change frequently. If not, then the website publisher will typically "hard-code" the content directly into each web page file.

If a CMS approach is chosen, the next step is to place all content items into a relational database, and to turn each web page file (via programming) into a "page template" that is bound to the CMS. The CMS then dynamically (or, in some systems, statically during a compilation process) creates individual web pages of a website by combining the content in the database with the layout, presentation and behavior defined in the web page template. At this point, the final web page is ready for delivery to an end user's browser.

A significant problem with the technologies and processes described above is that it is very difficult to build and integrate all of the content and web page (i.e. layout, presentation, and behavior) components needed for a sophisticated website. If a CMS is employed to manage content changes, the initial build is even more difficult, and even if a CMS is employed, it is still very difficult to make subsequent changes to site structure ("site map") and web page components without involving considerable programming.

For illustration, consider this simple example:

Without a CMS, combining content and web page visual aspects (layout, presentation and behavior) may be done like this using HTML and JavaScript:

```
<body>
    <div>
    style="background-color: yellow";
        onclick="showMenu(someElementID)"
    onmouseover="this.className=fredHighlight"
    onmouseout="this.classname="fred"
    class="fred">
        <p>
        This is some text
    </p>
    </div>
</body>
```

The above code would produce a section on a web page with a yellow background color (layout and presentation) as well as set up some code to handle mouse clicks, etc. (behavior). Finally, it would display the line "This is some text" (content) on the page.

Using a CMS, the above code would become:

```
<body>
    <div>
    style="background-color: yellow";
    onclick="showMenu(someElementID)"
    onmouseover="this.className=fredHighlight"
    onmouseout="this.classname="fred"
    class="fred">
        <p>
        $Content
    </p>
    </div>
</body>
```

The term "$Content" is a variable whose value (e.g. "This is some text") is defined and stored in a database that is populated by the website publisher. If the value of $Content is indeed "This is some text", then the CMS code above would produce, from the end user browser's perspective, exactly the same web page and content as the non-CMS code above. However, note that by implementing the CMS, the content in the database could be changed to any value (say, for example, "Hello World") and this would be automatically displayed on the web page the next time it is rendered.

The CMS approach therefore provides an improvement relative to the hard coding of all content into individual web pages in situations where the content is expected to change relatively frequently. However, the CMS approach also has significant drawbacks in that it does not facilitate changes in web page visual aspects. What if, for example, a website publisher wants to change the background color, or more interestingly to change what happens when the end user browser clicks or hovers on certain elements within a web page? How would the publisher add an entirely new web page to display new content?

Changes of this sort are examples of changes to web page visual aspects (including structure, layout, presentation and behavior), and cannot be implemented using current technologies without additional programming.

SUMMARY OF THE INVENTION AND ADVANTAGES

The present invention is addressed to these challenges.

The following summary provides a simplified overview of the subject matter that is described herein, and is not intended to identify any critical elements, nor to delineate the scope of the described or claimed subject matter. The sole purpose of the summary is to outline in a simplified form the aspects of the subject matter that will be described in greater detail below.

Briefly described, the subject matter disclosed herein relates in various embodiments to systems and methods that support the creation and lifecycle management of all the attributes and methods contained within a typical website in a completely object-oriented manner, such that traditional web programming languages, version control and content management systems are not required. A three tier approach is applied, providing a presentation tier, a logic tier and a storage tier.

At the presentation tier, some of the objects created and managed include:
 Sitemap and Navigation
 Pages and layout
 Page elements (aka widgets)
 Forms and database views
 Styles, and
 User event (mouse clicks, key presses, etc) handling
At the logic tier:
 Business rules, including workflows, and
 Server-side event handling
And at the storage tier:
 Configuration and object persistence
 Structured (headers, footers, body text, lists, blogs, news items—generically "content") and non structured (e.g., PDF files) user data storage
 User defined tables, and
 Search and retrieval of stored data In contrast to existing website production and delivery systems, the system and method described herein allows each object to be managed (created, updated, versioned) separately from each other, while retaining the relationships (containment, parent, child, sibling, is a, etc.) between the objects. For example, a content display object and its relationship to content items and pages that may contain it.

With this object-oriented design, objects within a website can be created and changed independently from each other without requiring textual programming. Objects are created and configured via a drag/drop or fill-in-the-blank metaphor, as are their behaviors and inter-relationships (e.g. Page to element, Form to table, table to fields, etc.).

According to one aspect of the present invention, there is taught a method of creating and managing websites and their content by providing on a system server a plurality of hierarchical classes of objects, each of the classes representing one aspect of the storage, presentation and logic of a website; providing on a web server an interface operable to present representations of objects instantiating the plurality of hierarchical classes, and receive commands meant to one of instantiate a new object, destroy a presented object, and change a property of a presented object; and storing on a database server objects as a traversable tree in accordance with the plurality of hierarchical classes.

The method further provides for rendering a requested portion of the website by traversing the corresponding portion of the object tree and generating a dynamic webserving in response to the properties of the traversed objects.

Providing an interface might include providing a user-interface or even providing a WYSIWYG user-interface. In that regard, presenting representations of objects might include presenting symbolic representations of objects.

Receiving commands might include receiving user-inputs.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF EMBODIMENTS OF THE INVENTION

Introduction

Referring to the Figures, like numerals indicate corresponding parts throughout the several views.

Figure 1:
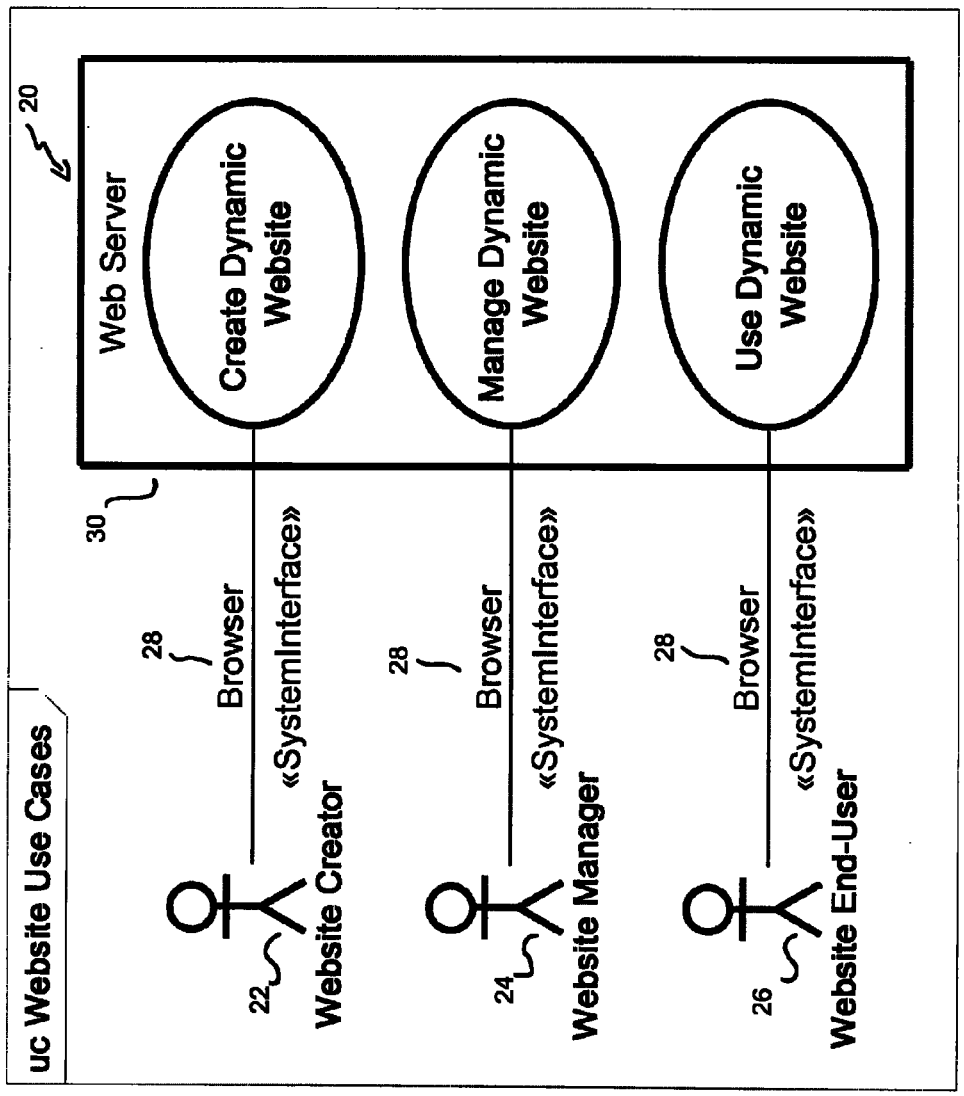
FIG. 1 is a UML 2.1 use case diagram illustrating how a website creator, a website manager and website end-user might interact with one embodiment of the present invention.

FIG. 1 generally illustrates a system for creating and managing a website 20 as an object-oriented structure. A website creator 22, website manager 24 and website end-user 26 respectively create, manage and use the dynamic website, communicating through their respective web browsers 28 with a web server 30.

Terminology

Throughout this specification, the term "web page" refers to the visual aspects of any given page of a website, including layout (e.g. the size and location of visual elements or "widgets" on each page), presentation (e.g. style, colors, and format of widgets), and behavior (e.g. what happens when a user moves a mouse 32, clicks a button or menu, hovers, etc.), The term "content" refers to the information (e.g. text and graphics, such as, for example, a news article) that is delivered to an end user browser 28 via the web pages of a given website.

The term "webserving" means a portion of code—generally some combination of HTML, CSS and JavaScript—sent from a web server 30 to a web browser 28 to direct the browser 28 to perform desired functionality, such a presenting a webpage or a portion of a webpage.

Those skilled in the art will understand that in an internetworked system 20 an action is often the result of coordinated activities occurring at multiple nodes in the system 20. In the case of a system 20 built on the Internet, these nodes are often distributed ad hoc and unpredictably across multiple jurisdictions. The actions as described and claimed herein are intended to encompass at least: (a) actions performed directly and completely within the jurisdiction of the patent, (b) actions coordinated within the jurisdiction but with at least some activities performed outside the jurisdiction, (c) actions coordinated outside the jurisdiction but with at least some activities performed within the jurisdiction, and (d) actions performed for the benefit of a node within the jurisdiction or a person using that node. An example of such coordination would be serving a layout for a web page from one node and serving content for insertion into the layout from one or more other nodes, including through the use of server-side scripting, client-side scripting, and AJAX techniques.

Structure

Figure 2:
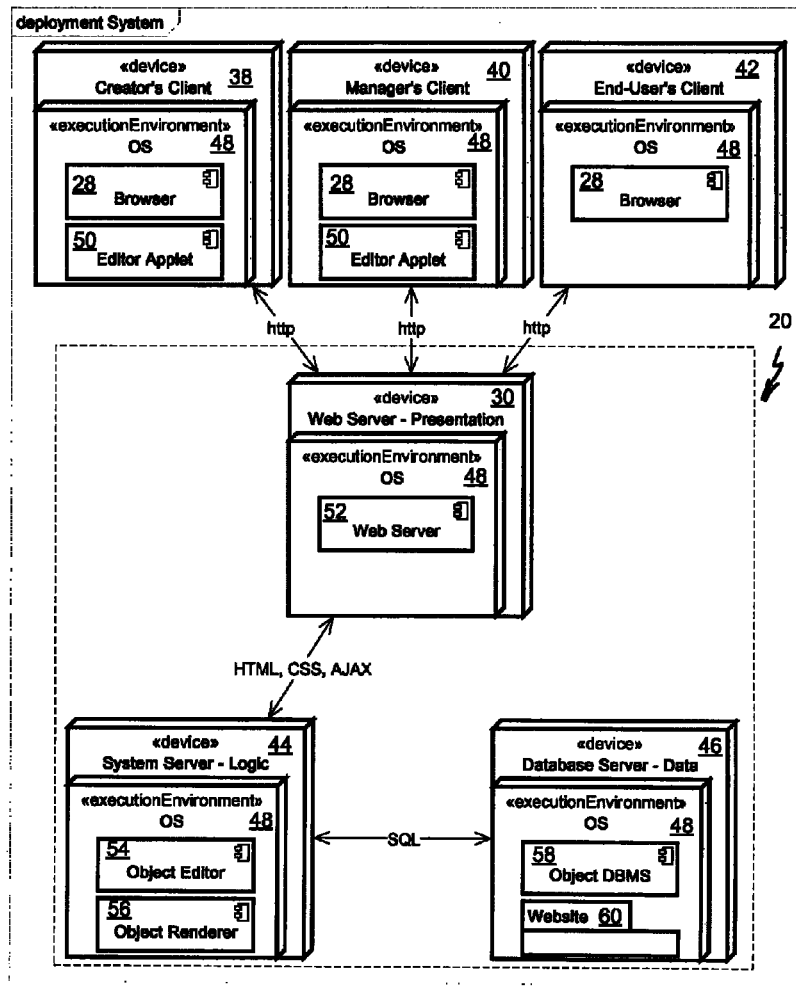
FIG. 2 is a UML 2.1 deployment diagram illustrating the deployment of the embodiment of FIG. 1 on an internetwork of communication and computing devices.

FIG. 2 is a deployment diagram of the system 20, which is deployed as an internetwork 34 of communication and computing devices 36. As will be discussed in greater detail below, the communication and computing devices 36 are variously configured as clients 38, 40, 42 and servers 30, 44, 46. More specifically, a client might be a website creator's client 38, a website manager's client 40 or a website end-user's client 42. A server might be a web server 30, a system server 44 or a database server 46.

Each of the clients 38, 40, 42 might be a duly configured general purpose programmable computer or a more purpose-specific device 36, such as a smartphone, a microbrowser, or portable media viewer with a wireless modem.

A server might similarly be a duly configured general purpose programmable computer, but might also be a farm of such computers or one or more virtualized computers embodied as processes operating on a physical general purpose programmable computer. Such farmed or virtualized computers might themselves be distributed over their own local or wide area network 34, not shown.

In essence, the servers 30, 44, 46 and the clients 38, 40, 42 are roles or functions performed in the system 20 by properly configured devices 36. Multiple roles or functions could be performed by one device 36 and one role or function could be distributed over multiple devices 36. The specific character of a device 36 (and more generally the hardware) and the network 34 topology is important to the extent that it supports the performance of the assigned roles or functions.

The web server 30, system server 44 and database server 46 may be connected together in three-tier fashion to serve the presentation, logic and data aspects of dynamic websites, the web server 30 and the system server 44 communicating in HTML, CSS and JavaScript and the system server 44 and the database server 46 communicating in SQL.

The clients 38, 40, 42 may communicate with the web server 30 using the HTTP protocol to interact with the websites. More particularly, the creator's client may communicate to create a website, the manager's client may communicate to manage a website, and the end-user's client may communicate to use a website.

To implement this arrangement, the devices 36 each host an operating system 48 that provides an execution Environment supporting the required functionality. The operating systems 48 might also support distributed execution among the devices 36.

In this way, the clients 38, 40, 42 each support a browser component 28 to implement communication with the web server 30, for example such as Microsoft® Internet Explorer®, Firefox®, Safari® or Opera®. The creator's client and the manager's client might also support an editor applet component 50 to better implement communication with the system server 44 for editing website objects, as will be discussed further below.

Similarly the servers 30, 44, 46 have dedicated components supported by the operating system 48 execution environment. The web server 30 has a web server component 52 that instructs it on how to perform its role as a web server 30, for example Apache® Apache® Microsoft® Internet Information Services® or Google® Google Web Server 30®. The system server 44 has an object editor component 54 and an object renderer component 56 that respectively instruct it on how to create, modify and destroy objects that represent aspects of a website and to render the objects into webservings that can be communicated by the web server 30. The database server 46 has a database management system component 58 that instructs it on how to create, store, search, maintain and destroy objects that represent aspects of a website drawn from a website package 60 of classes, which will be described further with respect to FIGS. 4-7.

Figure 3:
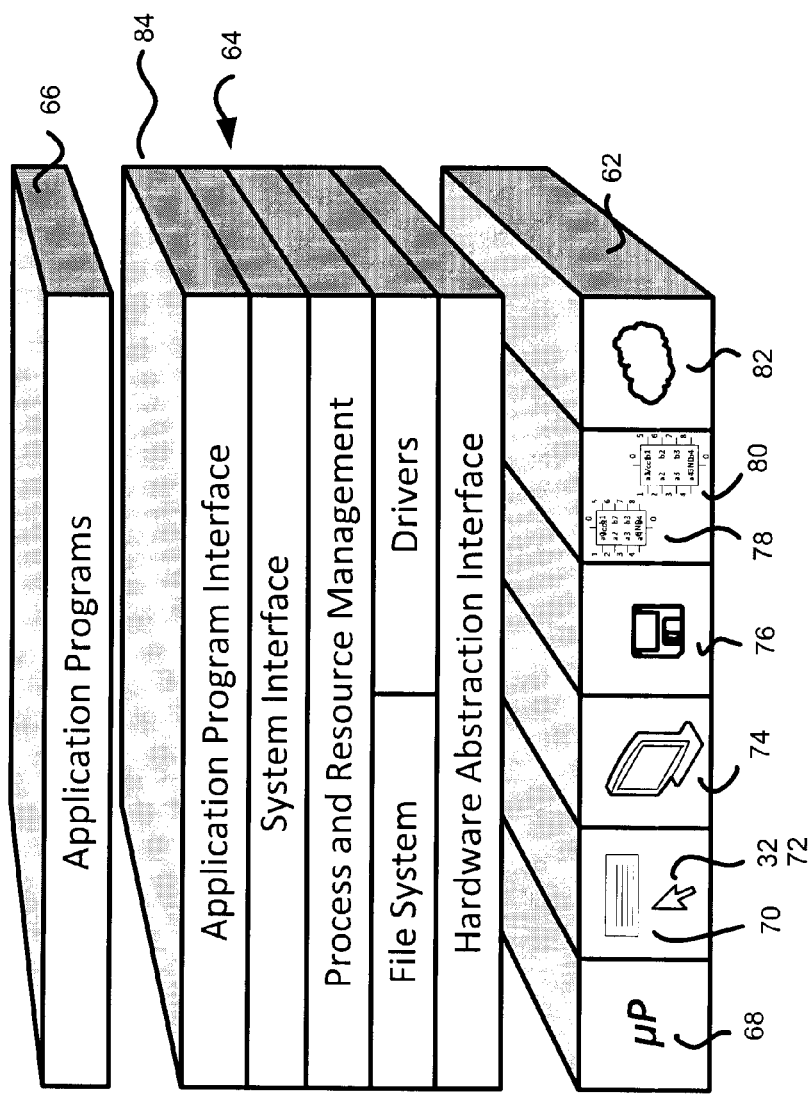
FIG. 3 is an abstraction layer diagram of a communication and computing devices of FIG. 2, illustrating a hardware layer, operating system layers and an application program layer.

FIG. 3 illustrates a common construction of a communication and computing device 36, including a general purpose programmable computer. These devices 36 have a hardware layer 62, an operating system layer 64 and an application program layer 66. Those skilled in the art will recognize the aspects in which like virtualized hardware and devices 36 depart from like physical ones.

The hardware layer 62 provides the device 36 with computing and communication hardware, including: (a) a processor 68 to execute processes of instructions and compute data, (b) user-input hardware such as a keyboard 70 and a selection device 72 (for example a mouse 32) to receive input from a user, (c) user-output hardware such as a video display 74 to provide information to a user, (d) mass storage 76 such as electromagnetic, optical or nonvolatile solid-state media to store data and processing instructions, (e) memory such as read only memory 78 and random access memory 80 to store data and processing instructions, and (f) a network interface 82 to support communication with other devices 36 in accordance with known protocols such as TCP/IP, all interconnected by buses such as address and data buses and control lines such as interrupt and clock lines and such other connections and components as is conventionally required and known in the art.

Stored in a portion of the read only memory 78 and the mass storage 76 are the components of the operating system layer 64, for example LINUX® or Microsoft® Windows® Server® for a device 36 such as general purpose programmable computer configured as a server 30, 44, 46 or LINUX® or Microsoft® Windows® VISTA® for a device 36 configured as a client 38, 40, 42, or even Microsoft® Windows® CE® for a portable such client 38, 40, 42 device 36. The operating system layer 64 provides the basic instructions to direct the processor 68 how to interact with the other hardware described above and more generally how to perform the functions of a communication and computing device 36, including storing, accessing and computing data, and communicating with other devices 36.

The operating system layer 64 also presents an application program interface 84 to the application program layer 66, so the processor 68 can execute more sophisticated combinations of processes under the direction of higher level application programs stored in mass storage 76 and loaded into RAM 80 for execution, for example the components described in FIG. 2.

Figure 4:
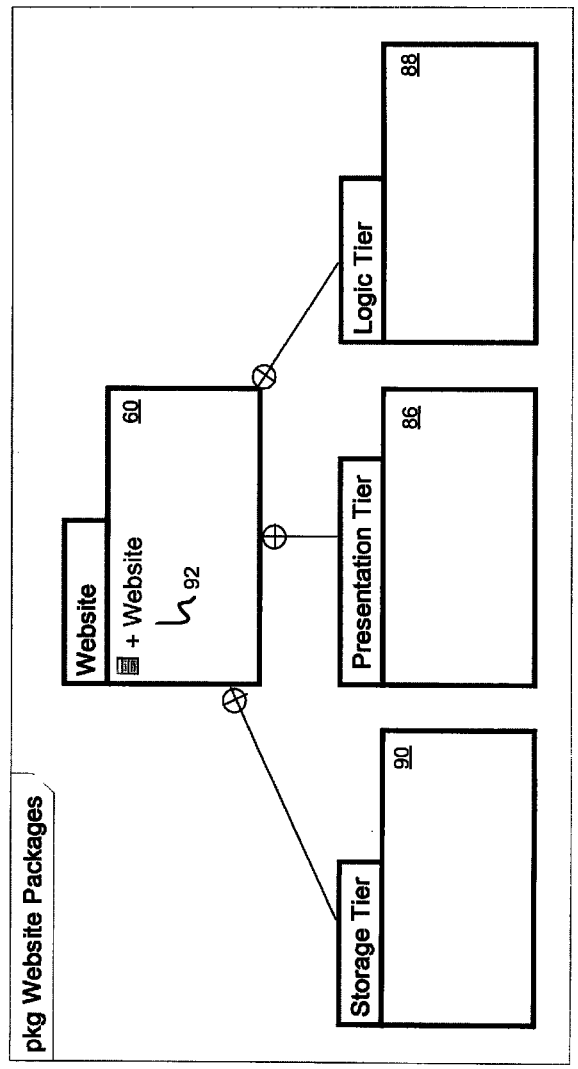
FIG. 4 is a UML 2.1 package diagram illustrating packages of hierarchical classes for representing a website, including a topmost Website class, a presentation tier package, a logic tier package and a storage tier package.
Figure 5:
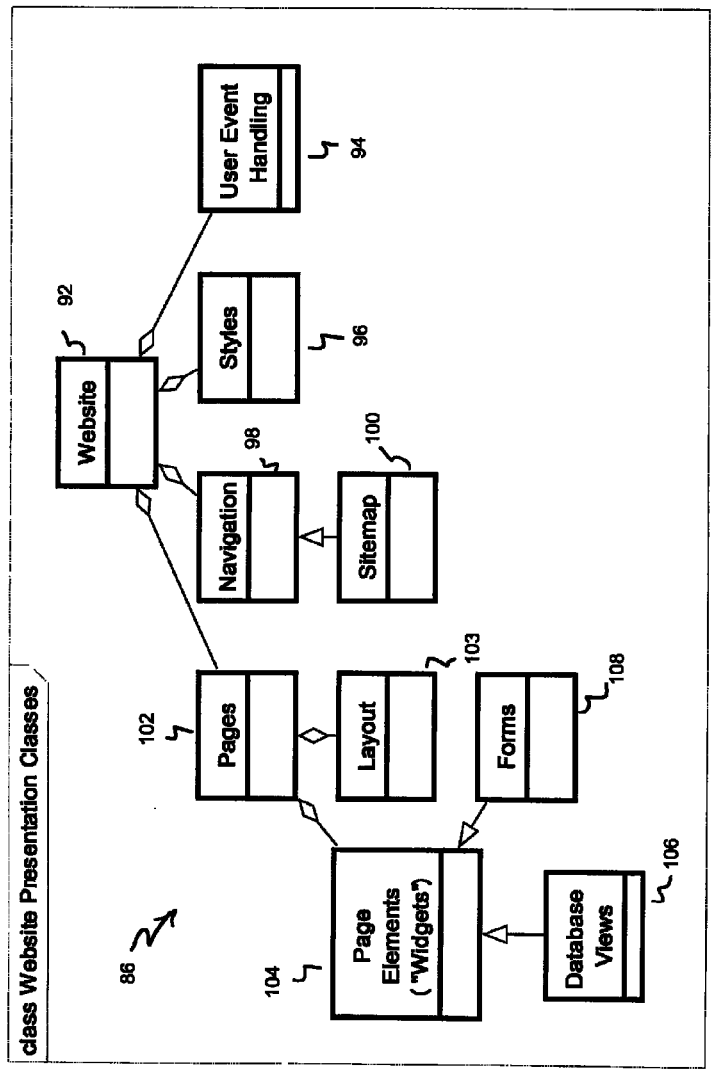
FIG. 5 is a UML 2.1 class diagram illustrating exemplary classes from the presentation tier package.

FIG. 4 illustrates packages 60, 86, 88, 90 of classes for completely representing a dynamic website in an object-oriented manner. In this regard, there is provided a Website package 60 that contains classes and packages 60, 86, 88, 90 for representing a dynamic website. The Website package 60 contains a Website class 92 that provides attributes and operations representing the overall nature of a website and further contains a Presentation Tier package 86, a Logic Tier package 88, and a Storage Tier package 90 that in turn contain classes that represent more particular aspects of the website FIG. 5 shows an example hierarchy of classes below the Website class 92 for representing presentation aspects of the website and inclusion in the presentation tier package 86. Thus for example, the presentation tier package 86 could include a User Event Handling class 94 for handling client-side user-events and a Styles class 96 for specifying the style of the website. The presentation tier package 86 could also include a Navigation class 98, for example a Sitemap class 100, for defining ways to navigate the website. The presentation tier package 86 might also include a Pages class 102 for defining aspects of each webpage, in cooperation with a Layout class 103 for defining visual layout aspects of the webpage and a Page Elements 104 class for representing page widgets, for example database 58 views and forms as represented respectively by a Database Views class 106 and a Forms class 108.

Figure 6:
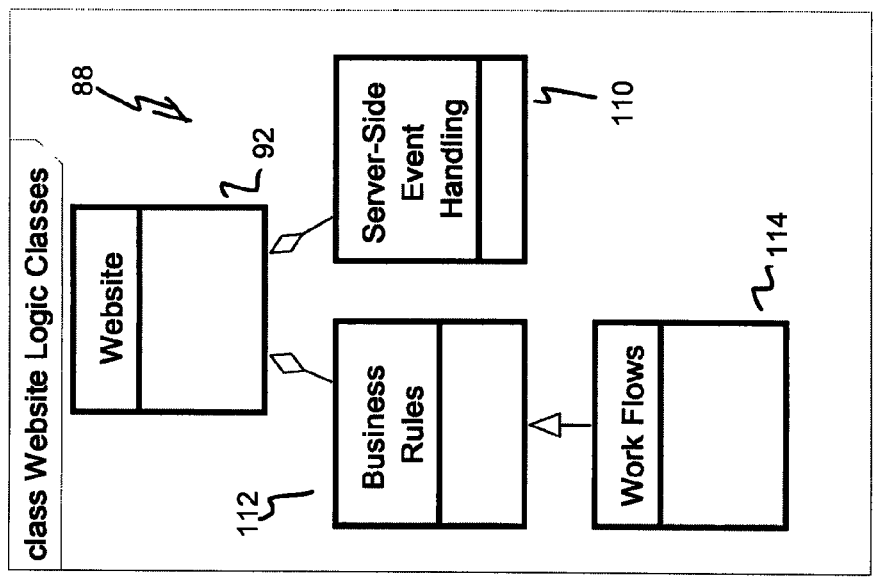
FIG. 6 is a UML 2.1 class diagram illustrating exemplary classes from the logic tier package.

FIG. 6 shows an example hierarchy of classes below the Website class 92 for representing logic aspects of the website and inclusion in the logic tier package 88. Thus for example, the logic tier package 88 could include a Server-Side Event Handling class 110 for handling server-side events and a Business Rules class 112 for representing the business rules that establish the logical operation of the website, for example workflows as represented by a Work Flows class 114.

Figure 7:
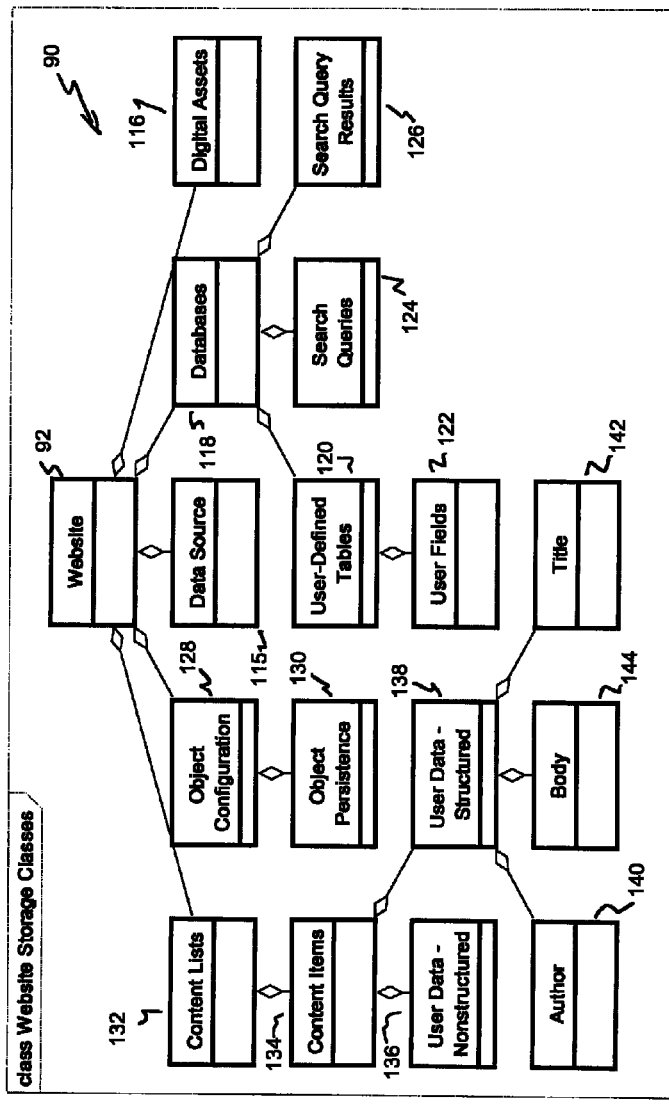
FIG. 7 is a UML 2.1 class diagram illustrating exemplary classes from the storage tier package.

FIG. 7 shows an example hierarchy of classes below the Website class 92 for representing storage aspects of the website and inclusion in the storage tier package 90. Perhaps most importantly, the storage tier package 90 includes a Data Source class 115 to enable objects to be either local, for example on the website manager's 24 own network, or hosted by a software as a service vendor on the system 20. Thus for example, the website manager's 24 own network might provide a web application that the system 20 can interact with via objects of the Data Sources class 115 to allow an end-user 26 to access and interact with the local application via web pages that are created and managed by the system 20. In this regard, "Data Sources" are a class of object in the system 20 that sit on top of the data tier and contains and abstracts the information needed for the system 20 to "bind" to a set of web services exposed by any web application, which may encapsulate its own set of presentation, logic and storage tier objects. In the hosted case, objects of the Data Sources class 115 simply point to data objects within the system 20. In this way, the website manager 24 can create web pages that render content from data objects that are stored and managed in other business applications that are exposed to the internet via XML web services, for example SOAP and REST.

The storage tier package 90 could also include a Digital Assets 116 class for representing digital assets 116 and a Databases class 118 for representing databases. The Databases class 118 could include a number of aggregate classes, including a User-Defined Tables class 120 for representing the data structure, including for example fields represented by a User Fields class 122, a Search Queries class 124 for representing search queries, and a Search Query Results class 124, 126 for representing query results. The storage tier package 90 might also include an Object Configuration class 128 for representing the configuration of objects, including for example object persistence as represented by an Object Persistence class 130. Additionally, the storage tier package 90 might include classes for representing content for the website, for example a Content Lists class 132 that represents a cataloguing of content items as represented by a Content Items class 134. The Content Items class 134 might in turn include a number of aggregate classes such as a User Data—Nonstructured class representing unstructured data and a User Data—Structured class representing structured data, for example data having an author, title and body as respectively represented by an Author class 140, a Title class 142, and a Body class 144.

Those skilled in the art will recognize the hierarchical nature of the classes and packages 60, 86, 88, 90 contained in the Website package 60, such that traversing the tree of the hierarchy will produce a definition of the website or of that portion defined by the portion of the tree traversed.

Thus FIGS. 4-7 graphically depict the types of classes within an exemplary system 20 and the relationships between them. Many sites, as well as their child objects, can be hosted and managed by the system 20 at once. As shown, a site object can contain one or more page objects which, in turn, can contain one or more widgets (page elements 104), etc.

Each of the objects of the system 20 has a defined set of behaviors, properties and events. Once a site object has been created, the manager can create, update and delete styles, pages, content lists, database 58 tables, workflows and digital assets 116 completely independently from each other. All object configurations are stored in the database management system 58 to enforce data integrity, versioning, search and retrieval.

After a site and its related objects have been configured, the system 20 is ready to serve data to client browser 28 requests. When a browser 28 requests data (e.g. a particular web page), the system 20 dynamically creates the data necessary for the web browser 28 to render the page accurately to the end user. This is done by traversing the object tree associated with a given request, reading the correct version of each object from the database 58, binding all object data together and lastly creating an HTML representation of the requested data. This technique allows all of a web site's objects to be treated and handled in a truly object-oriented manner on the server side while ultimately transforming them into the structural elements (HTML, CSS, Image files) needed by a web browser 28 to render and interact with end-users of the website.

Figure 8:
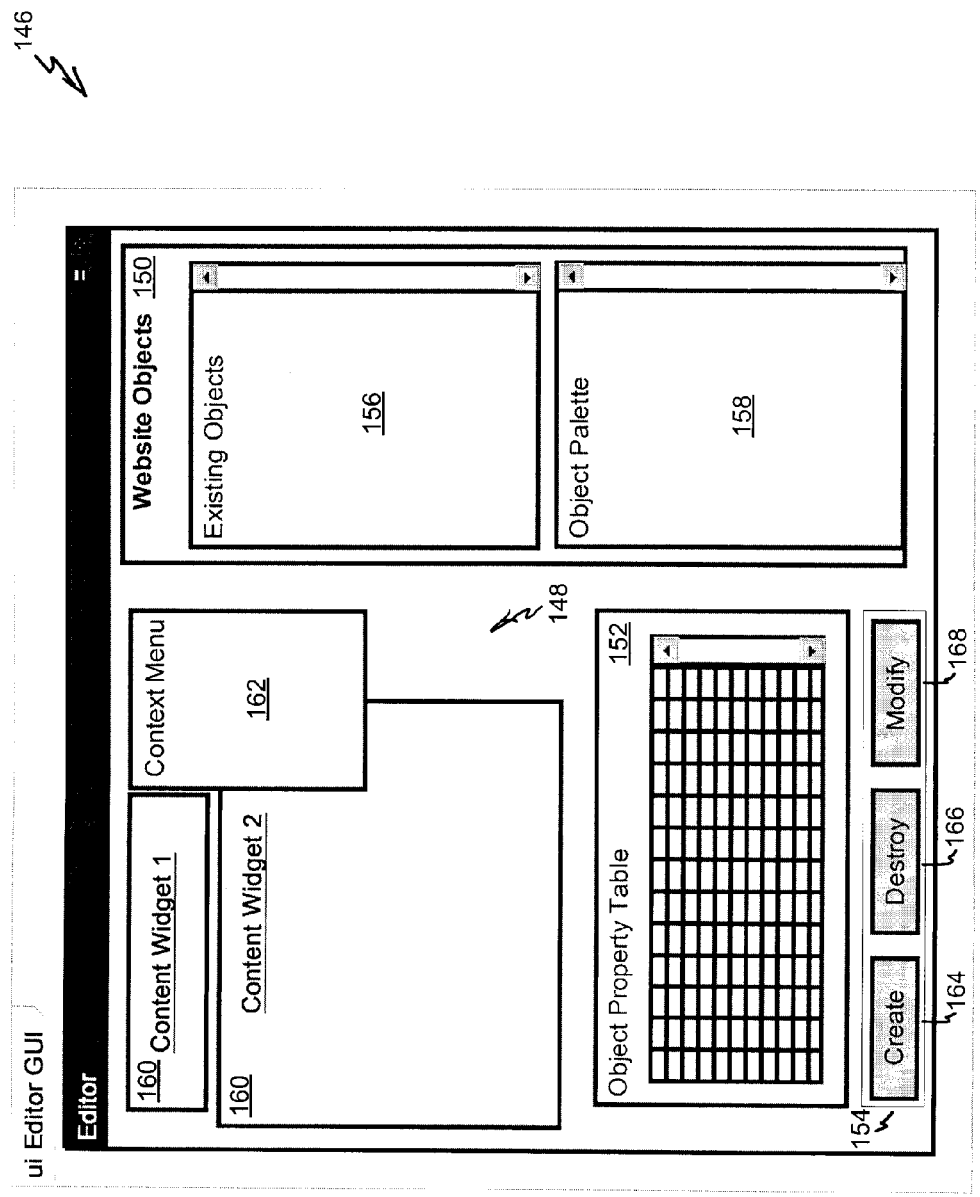
FIG. 8 is a user interface diagram illustrating a main screen of an editor for creating and managing objects instantiating the classes of FIGS. 4 through 7 to represent a particular website.

FIG. 8 shows a graphical user interface 146 of the object editor component 54, presented by the browser component 28 on the creator's client or the manager's client, with the assistance of the editor applet component 50 if one exists, to enable the creator or manager to interact with the object editor component 54 on the system 20 sever via the web server 30 for the purpose of creating, modifying or destroying objects instantiating classes in the Website package 60 to create or manage a website.

The GUI 146 includes four main regions, a WYSIWYG design region 148, an objects catalog region 150, an object property table region 152, and a button pad region 154.

The catalog region includes an existing objects list 156 that catalogs all objects that currently exist to represent aspects of the website and an object palette 158 that catalogs all available classes for representing aspects of a website for which objects may be instantiated.

The design region 148 provides a "what-you-see-is-what-you-get" area for laying out the presentation aspects of a portion of a website, for example placing and sizing content item objects 160 ("widgets"). A context menu 162 may be available to conveniently set various common properties of a selected one of the content item objects 160.

The object property table 152 provides a way to inspect and modify the properties of a selected object, including objects that may not be conveniently represented in the design region 148 such as objects instantiating classes in the logic tier package 88 or the storage tier package 90.

The button pad region 154 provides a create button 164, a destroy button 166 and a modify button 168. The create button 164 instantiates an object selected from the object palette 158 and presents it for inspection and modification in the object property table 152. The destroy button 166 destroys the selected object. The modify button 168 presents the selected object in the object property table 152 from inspection and modification.

Operation—Creating and Managing

In operation, a website creator 22 or website manager 24 creates or manages a website through the GUI 146 described in FIG. 8. He can select from the existing objects catalog 150 any of the objects that currently represent aspects of the website and the selected object will be presented in the object property table 152 and, in the case of objects that can be represented by the WYSIWYG paradigm, selected in the design region 148. The properties of the selected object can be modified in the object property table 152 upon pressing the modify button 168. Alternatively, common properties of objects presented in the design region 148 can be modified using the context menu 162.

Objects in the WYSIWYG design area can be selected, moved, resized, reflowed, etc. as directed by the mouse 32 or another user input device 36. New objects can be dragged from the object palette 158 and placed as desired onto the design area.

Pressing the create button 164 instantiates an object selected from the object palette 158 and presents it for inspection and modification in the object property table 152. Pressing the destroy button 166 destroys the selected object.

In general, the object editor (presented in a standard web browser 28) hosts web pages and objects that form the user interface for creating and managing websites, including pages, forms, tables and structured content. All user interface elements within the object editor can be hosted in an AJAX standard web browser 28 with no client-side plug ins. The object editor sends user input and receives and renders system 20 responses via standard internet technologies, namely using the AJAX design pattern along with XHMTL compatible data, all transferred via http to a standard web server 30.

The web server 30 redirects all traffic from the object editor (or from the client's browser 28) to the system server 44. In simplest terms, the system server 44 is responsible for storing page and content data changes received from configuration tool or from display, and returning data changes in a manner that is compatible for a browser 28 to properly render it visually. All data changes are stored and retrieved from relational database 58. In this regard, the web server 30 provides an interface operable to present representations of and functions as means for representing objects instantiating the plurality of hierarchical classes and to receive commands meant to one of: (1) instantiate a new object, (2) destroy a presented object, and (3) change a property of a presented object. As embodied, this interface includes a user-interface and in fact a WYSIWYG user-interface, this representation includes symbolic representation and the commands include user-input.

The database server 46 performs standard database 58 tasks for the system 20, including: persistence and retrieval, indexing and search, transactions and rollback, enforcement of data typing and relational integrity as well as replication and archiving.

At a deeper level, the system server 44 consists of a complete or partial set of the objects that define a website, with one topmost Website object for each user's web site, as well as objects for each page, table, content item, etc. that a given site may contain. Each object is derived from a set of hierarchical classes and sub-classes that allow each object to:

store and retrieve their own configuration data from the database 58;

store and manage an indefinite history of changes to itself such that any previous state of itself can be restored should the latest version of an object not be what a user wants;

render itself in a manner that is compatible with web browsers 28;

accept user input and process it in an object specific way; and, define their own rules for how to handle user—or system 20 events. E.g., Mouse 32 clicks or record adds/updates.

In this regard, system server 44 provides and functions as means for providing a plurality of hierarchical classes of objects, each of the classes representing one aspect of the storage, presentation and logic of a website.

By using object orientation, new object instances (or classes of objects) can be added to the system 20 or changed without affecting other objects in the system 20. Further, new objects can be derived from existing objects, thereby inheriting the features of the base object while still allowing customization of the new object. For example, a blog object can be created that is based upon the content list object, thereby inheriting its storage and enumeration mechanism while allowing its own, encapsulated version control. In this regard, the database server 46 stores and functions as means for storing objects as a traversable tree in accordance with the plurality of hierarchical classes.

Operation—Using

Figure 9:
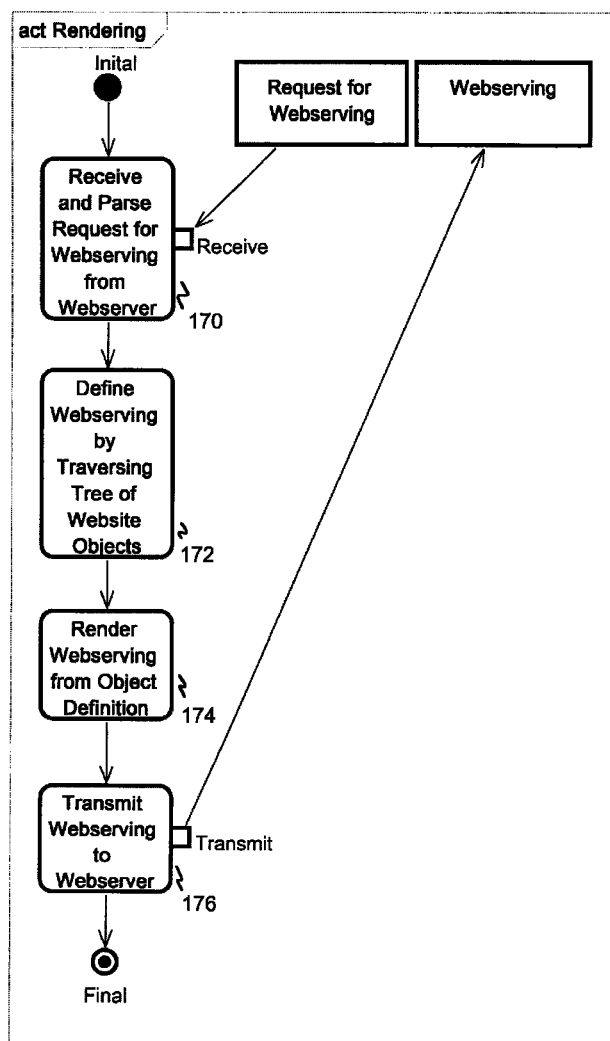
FIG. 9 is a UML 2.1 activity diagram illustrating the operation of an object rendering component deployed in FIG. 2.

Referring now to FIGS. 2 and 9, when a website end-user 26 wants to use a website, he directs the browser component 28 on his device 36 to the web server 30 to request presentation of a particular portion of the website. That portion might be a webpage or a lesser portion, for example in the case of AJAX techniques.

The web server component 52 on the web server 30 receives this request and conveys it to the system server 44, where the object renderer component 56 receives it.

In a receipt and parsing step 170, the request for webserving is parsed to determine what is being requested and what portion of the website the request relates to.

In a define webserving step 172, the objects that define the portion of the website relevant to the request are read by traversing the tree hierarchy of the objects.

In a render webserving step 174, a webserving is assembled in HTML, CSS and JavaScript code that renders requested portion of the website as defined in the relevant objects.

In a transmit webserving step 176, the webserving is transmitted to the web server 30 for transmission to the browser component 28 of the end-user.

Figure 10:
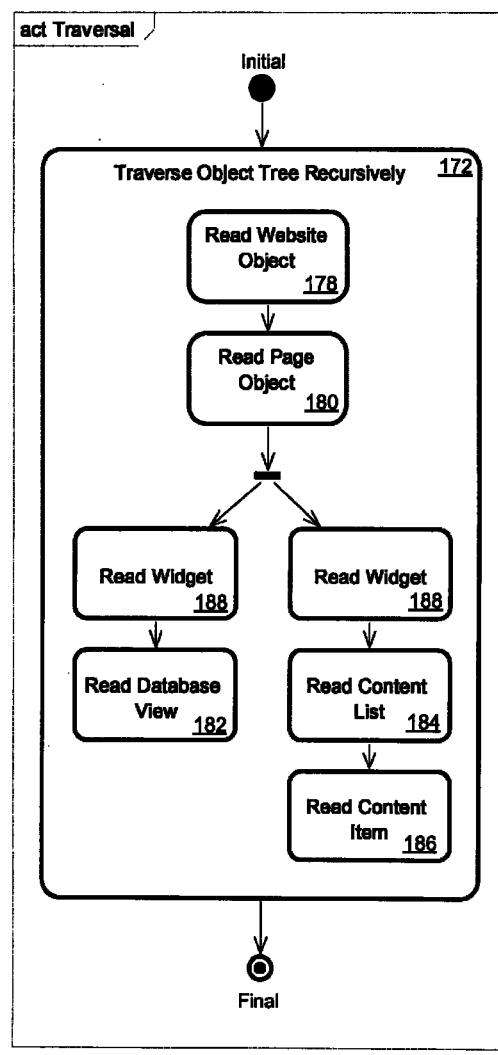
FIG. 10 is a UML 2.1 activity diagram detailing an exemplary rendering of the object rendering component of FIG. 9.

FIG. 10 illustrates an example traversal of the hierarchy of objects defining a webpage during execution of the define webserving step 172. In this example traversal, the overall website object is read 178, then the relevant page object is read 180, then in parallel two relevant page widget objects are read. With respect to one of the two page widget objects, a database view object is read 182, which ends the traversal of that branch. With respect to the other one of the two page widget objects, a content list object is read 184, following which a content item object is read 186, which ends the traversal of the other branch and the relevant portion of the tree.

Thus the system server 44 renders and functions as means for rendering a requested portion of a website by traversing the corresponding portion of the object tree and generating a dynamic webserving in response to the properties of the traversed objects.

In greater detail, referring back to FIG. 9, when the end-user requests a given web page within a given site, the request (via an URL—e.g., http://yoursite.com/page1) is transferred via the web server 30 and http to the system server 44. Within the system server 44, the top level website object locates requested page object from the object repository in the DBMS 58. Next, the "published version" of the page object enumerates all of the published versions of each widget object(s) contained within the requested page object and tells them to create themselves. Note that the page object has no knowledge of the internals of each widget: their versioning information, data format on disk or how they behave is all encapsulated within each widget object. Note also that any changes to the page (e.g., new/deleted/updated widgets) would automatically be reflected each time a page is requested.

Once each page widget is created in memory, it is activated—allowing each widget to run its own specific code and bind to its data. In the case of content block widgets or "list viewers", the data is retrieved by binding to and reading from content list objects. Each widget on a given page binds its own data source; for example, with reference to FIG. 10, the page binds the content block widget and the other widget, and the other widget binds its data source.

Once a content list object is requested by a content block widget, it enumerates and creates its child objects, content item(s). Again, each list item is an object, encapsulating the knowledge of its internal versions and state information, as well as how to read, process and present its data within itself.

Once each page widget object has been created, performed its initialization, and received its data from it data sources (e.g., content lists), it renders itself within the page container for viewing in the end-user's browser 28. That is, each widget dynamically produces the HTML, CSS and JavaScript necessary within the requested page for rendering in the web browser 28 and processing of user input.

Lastly, the system server 44 sends the fully rendered page (or only the changed portion of the page if the page is already loaded within the end-user's browser 28) back to the end-user's browser 28 for presentation and user input.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A method for creating and managing a website as an object-oriented system, comprising:
   (a) providing, on a system server computer, a plurality of hierarchical classes of objects, wherein each object of the plurality of hierarchical classes of objects represents one aspect of storage, presentation, and logic of a website, wherein each object of the plurality of hierarchical classes of objects is managed separately from each other while retaining relationships between the plurality of hierarchical classes of objects organized as packages of classes, and wherein the packages of classes are organized by tiers;
   (b) providing, on a web server computer, a user-interface operable to:
      (i) present representations of objects instantiating the plurality of hierarchical classes of objects; and
      (ii) receive commands meant to one of:
         (1) instantiate a new object;
         (2) destroy a presented object; and
         (3) change a property of a presented object; and
   (c) storing, on a database server computer, objects as a traversable object tree in accordance with the plurality of hierarchical classes of objects.

2. A method as claimed in claim 1, further including rendering, on the system server computer, a requested portion of the website by:
   (a) traversing a corresponding portion of the traversable object tree that defines the requested portion of the website; and
   (b) generating a dynamic webserving that renders the requested portion of the website in response to properties of the traversed objects from the corresponding portion of the traversable object tree.

3. A method as claimed in claim 1, wherein presenting representations of objects includes presenting symbolic representations of objects.

4. A method as claimed in claim 3, wherein providing a user-interface includes providing a What-You-See-Is-What-You-Get (WYSIWYG) user-interface.

5. A method as claimed in claim 4, wherein receiving commands includes receiving user-inputs.

6. A method as claimed in claim 1 wherein the relationships between the plurality of hierarchical classes of objects comprise at least containment, parent, child, or sibling.

7. A system for creating and managing a website as an object-oriented system, comprising:
   (a) a system server computer operable to provide a plurality of hierarchical classes of objects, wherein each object of the plurality of hierarchical classes of objects represents one aspect of storage, presentation, and logic of a website, wherein each object of the plurality of hierarchical classes of objects is managed separately from each other while retaining relationships between the plurality of hierarchical classes of objects organized as packages of classes, and wherein the packages of classes are organized by tiers;
   (b) a web server computer in communication with the system server computer and operable to provide a user-interface operable to:
      (i) present representations of objects instantiating the plurality of hierarchical classes of objects; and (ii) receive commands meant to one of:
(1) instantiate a new object;
(2) destroy a presented object; and
(3) change a property of a presented object; and
(c) a database server computer in communication with the system server computer and operable to store objects as a traversable object tree in accordance with the plurality of hierarchical classes of objects.

8. A system as claimed in claim 7, wherein the system server computer is further operable to render a requested portion of the website by:
(a) traversing a corresponding portion of the traversable object tree that defines the requested portion of the website; and
(b) generating a dynamic webserving that renders the requested portion of the website in response to properties of the traversed objects from the corresponding portion of the traversable object tree.

9. A system as claimed in claim 7, wherein the web server computer is further operable to present representations of objects that are symbolic representations of objects.

10. A system as claimed in claim 9, wherein the web server computer is further operable to provide a user-interface that is a What-You-See-Is-What-You-Get (WYSIWYG) user-interface.

11. A system as claimed in claim 10, wherein the web server computer is further operable to receive commands that are user-inputs.

12. A system as claimed in claim 7 wherein the relationships between the plurality of hierarchical classes of objects comprise soluable at least containment, parent, child, or sibling.

13. A system for creating and managing a website as an object-oriented system, comprising:
(a) means for providing a plurality of hierarchical classes of objects, wherein each object of the plurality of hierarchical classes of objects represents one aspect of storage, presentation, and logic of a website, wherein each object of the plurality of hierarchical classes of objects is managed separately from each other while retaining relationships between the plurality of hierarchical classes of objects organized as packages of classes, and wherein the packages of classes are organized by tiers;
(b) means for providing a user-interface, including:
(i) means for presenting representations of objects instantiating the plurality of hierarchical classes of objects; and
(ii) means for receiving commands meant to one of:
(1) instantiate a new object;
(2) destroy a presented object; and
(3) change a property of a presented object; and
(c) means for storing objects as a traversable object tree in accordance with the plurality of hierarchical classes of objects.

14. A system as claimed in claim 13, further including means for rendering a requested portion of the website.

15. A system as claimed in claim 14, wherein the means for rendering includes:
(a) means for traversing a corresponding portion of the traversable object tree that defines the requested portion of the website; and
(b) means for generating a dynamic webserving that renders the requested portion of the website in response to properties of the traversed objects from the corresponding portion of the traversable object tree.

16. A system as claimed in claim 13, wherein the means for presenting representations of objects includes means for presenting symbolic representations of objects.

17. A system as claimed in claim 16, wherein the means for providing a user-interface includes means for providing a What-You-See-Is-What-You-Get (WYSIWYG) user-interface.

18. A system as claimed in claim 17, wherein the means for receiving commands includes means for receiving user-inputs.

19. A system as claimed in claim 13 wherein the relationships between the plurality of hierarchical classes of objects comprise at least containment, parent, child, or sibling.

* * * * *